(12) United States Patent
Swiler et al.

(10) Patent No.: US 8,172,935 B2
(45) Date of Patent: May 8, 2012

(54) SPECIAL EFFECT PIGMENTS

(75) Inventors: Daniel R. Swiler, Washington, PA (US);
Gary L. Nuccetelli, Scenery Hill, PA (US); Sean T. Weir, Bridgeville, PA (US)

(73) Assignee: Ferro Corporation, Cleveland, OH (US)

( * ) Notice: Subject to any disclaimer, the term of this patent is extended or adjusted under 35 U.S.C. 154(b) by 584 days.

(21) Appl. No.: 11/995,001

(22) PCT Filed: Jul. 25, 2007

(86) PCT No.: PCT/US2007/074301
§ 371 (c)(1),
(2), (4) Date: Feb. 23, 2008

(87) PCT Pub. No.: WO2008/014309
PCT Pub. Date: Jan. 31, 2008

(65) Prior Publication Data
US 2010/0126562 A1 May 27, 2010

Related U.S. Application Data

(60) Provisional application No. 60/820,343, filed on Jul. 25, 2006.

(51) Int. Cl.
*C04B 14/00* (2006.01)
(52) U.S. Cl. .................................................. 106/480
(58) Field of Classification Search .................. 106/480
See application file for complete search history.

(56) References Cited

U.S. PATENT DOCUMENTS

| | | | |
|---|---|---|---|
| 4,074,010 A * | 2/1978 | Knight | 428/422 |
| 4,075,029 A | 2/1978 | Nuss | |
| 4,159,207 A | 6/1979 | Nuss | |
| 4,202,702 A | 5/1980 | Nuss | |
| 4,353,991 A | 10/1982 | Van Ness et al. | |
| 4,820,760 A | 4/1989 | Ali et al. | |
| 5,228,910 A | 7/1993 | Joyce et al. | |
| 5,714,420 A | 2/1998 | Sakoske et al. | |
| 5,814,434 A * | 9/1998 | Nakamura et al. | 430/25 |
| 6,077,797 A | 6/2000 | Sperlich et al. | |
| 6,207,285 B1 | 3/2001 | Sakoske et al. | |

(Continued)

FOREIGN PATENT DOCUMENTS
EP 1621586 A1 * 2/2006

OTHER PUBLICATIONS

Stoecklein, "Plate-Like Pigments in Automotive Paints: a Review," Apr. 26, 2002.*

(Continued)

*Primary Examiner* — Keith Hendricks
*Assistant Examiner* — Eli Mekhlin
(74) *Attorney, Agent, or Firm* — Rankin, Hill & Clark LLP

(57) ABSTRACT

The present invention provides mixed metal oxide based special effect pigments that can be incorporated into optically thin binder systems to produce a "metal flake" appearance that is superior to the "metal flake" appearance presently achievable using conventional special effect pigments. Special effect pigments according to the invention comprise at least 10 wt % of mixed metal oxides that exhibit the McConnellite ($Cu^{1+}Cr^{3+}O_2$) crystal structure. Other metallic elements can be incorporated into the crystal lattice structure to alter the appearance effect of the pigments.

17 Claims, 11 Drawing Sheets

U.S. PATENT DOCUMENTS

| | | |
|---|---|---|
| 6,346,493 B1 | 2/2002 | Kniajer et al. |
| 6,416,868 B1 | 7/2002 | Sullivan et al. |
| 6,454,848 B2 | 9/2002 | Sliwinski et al. |
| 6,503,310 B1 | 1/2003 | Sullivan |
| 6,540,824 B1 | 4/2003 | Suzuki et al. |
| 6,566,289 B2 | 5/2003 | Aronica et al. |
| 6,582,814 B2 * | 6/2003 | Swiler et al. .......... 428/328 |
| 6,680,121 B2 | 1/2004 | Sakoske et al. |
| 6,838,494 B2 | 1/2005 | Chundury et al. |
| 7,014,701 B2 | 3/2006 | Stewart et al. |
| 2007/0265154 A1 | 11/2007 | Baldwin et al. |

OTHER PUBLICATIONS

Unknown, http://webmineral.com/data/Mcconnellite.shtml, accessed on Jul. 21, 2011 and archived to Sep. 2, 2000.*

* cited by examiner

SPECIAL EFFECT PIGMENTS

BACKGROUND OF THE INVENTION

1. Field of the Invention

The present invention relates to special effect pigments. More particularly, the present invention relates to mixed metal oxide based special effect pigments, compositions containing mixed metal oxide based special effect pigments and methods of making the same.

2. Description of the Related Art

Special effect pigments are used in a variety of applications including, for example, automotive paints, plastics and other coatings and finishes. Many of the conventional special effect pigments are based on thin, surface treated flakes of base metals (e.g., silver and aluminum) or inorganic materials (e.g., mica with alternating layers of low refractive index materials such as titania and silica or graphite). When incorporated into binder systems or polymers, the flat surfaces of the individual pigment flakes act like microscopic mirrors that reflect incident light (i.e., specular reflection), providing a the surface with a bright metallic-like finish over a wide viewing angle.

Many of the conventional effect pigments, and particularly effect pigments based on mica, tend to be inherently light in color. In cases where a dark colored coating or substrate is desired, the use of such conventional effect pigments can cause the substrate to appear lighter than desired or to have a "washed out" appearance. In addition, most mica based effect pigments tend to provide a relatively consistent metallic appearance over a wide viewing angle. A pigment that looks metallic over a narrower viewing angle is sometimes preferred because it can provide special effects such as a change in apparent color or effect of the substrate depending upon viewing angle and/or illumination angle.

SUMMARY OF THE INVENTION

The invention provides mixed-metal oxide special effect pigments that can be incorporated into optically thin binder systems to produce a special effect appearance that is superior, in some cases, to the "metal flake" appearance presently achievable using conventional special effect pigments.

Special effect pigments according to the invention comprise at least 10 wt % of mixed metal oxides that exhibit the McConnellite crystal structure. Other metallic elements can be incorporated into the crystal structure to alter the appearance effect of the pigments.

For example an embodiment of the invention is a composition comprising intentionally added mixed-metal oxide pigment particles having a McConnellite crystal structure.

A further embodiment of the invention is A method of making a pigment comprising: providing a mixture of precursor compounds comprising copper atoms, chromium atoms, and oxygen atoms; and calcining the mixture to produce the pigment, wherein the pigment comprises at least 10 wt % of particles having a McConnellite crystal structure. Other embodiments of the invention include a glass enamel composition comprising an intentionally added mixed-metal oxide pigment including particles having a McConnellite crystal structure. A further embodiment is a substrate coated with a coating, wherein the substrate is selected from the group consisting of metal, glass, enamel, or ceramic, and wherein the coating comprises, prior to firing or curing, an intentionally added mixed-metal oxide pigment including particles having a McConnellite crystal structure. The pigments of the invention can be used to color glazes and glass enamels, in some cases, imparting a metallic effect thereto.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1A:
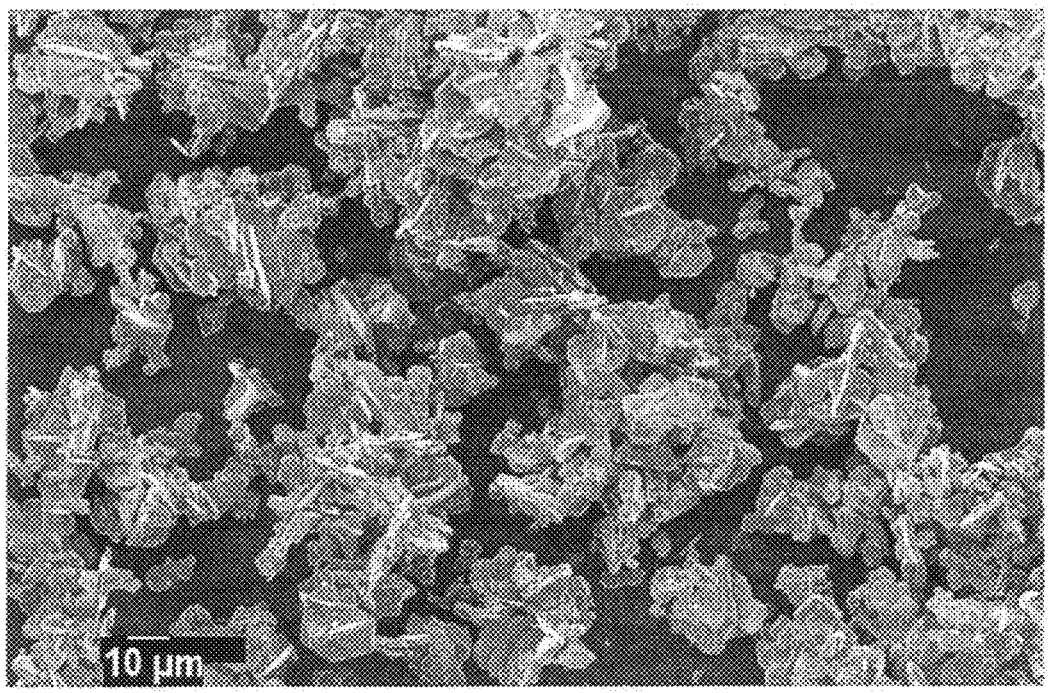
FIGS. 1A through 1D are scanning electron micrographs of a special effect pigment in accordance with the invention at 1,400×, 2,800×, 5,600× and 14,000× magnification, respectively.
Figure 1B:
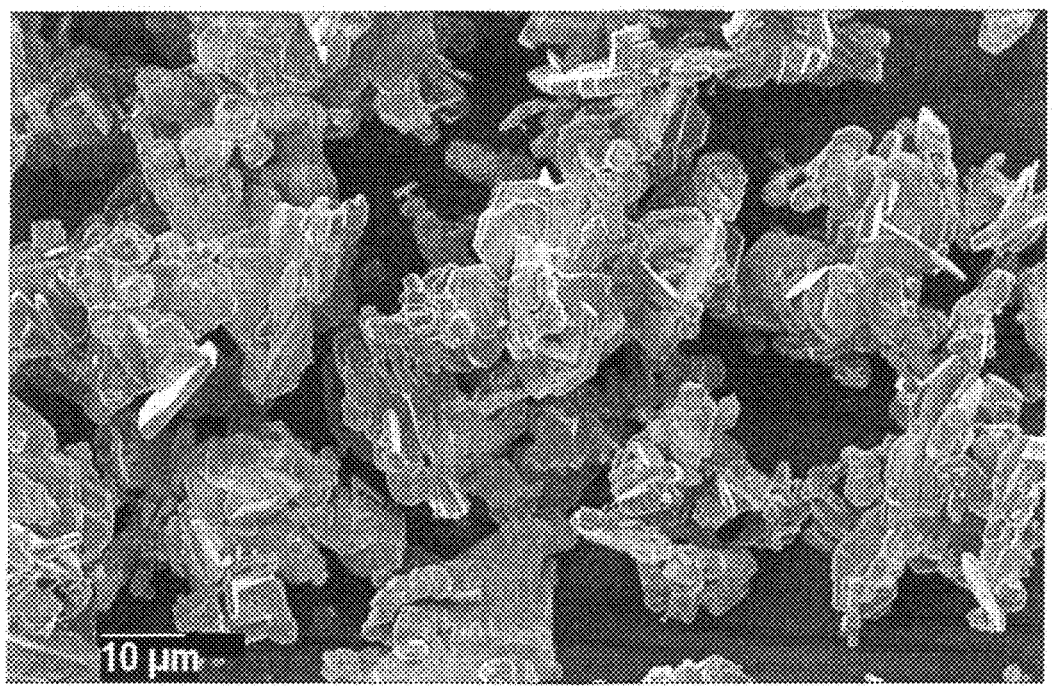
Figure 1C:
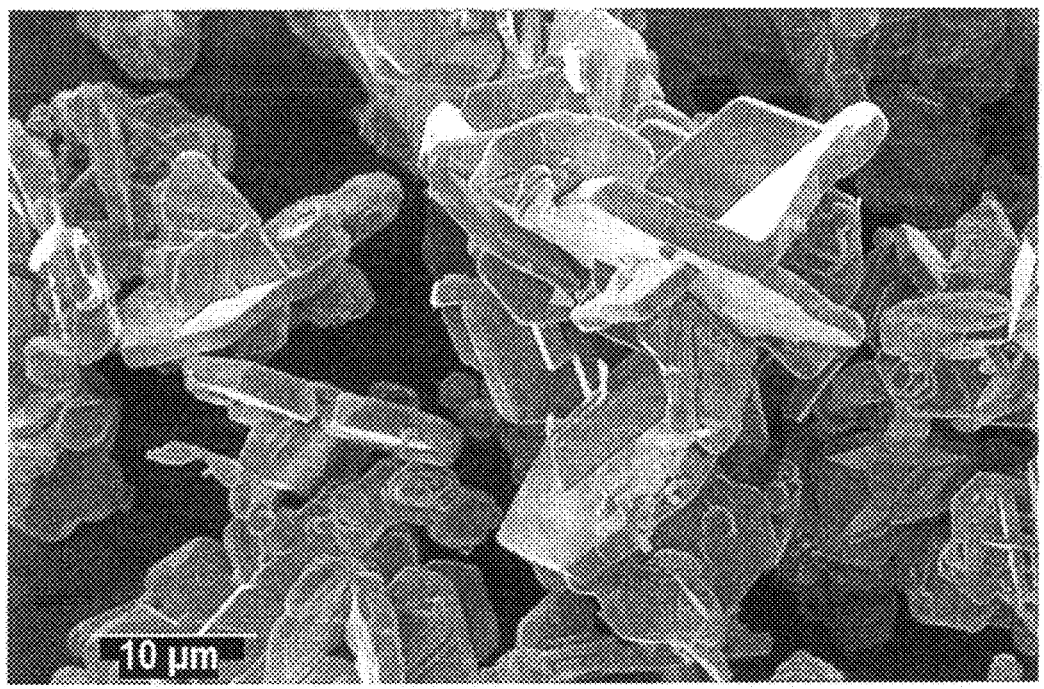
Figure 1D:
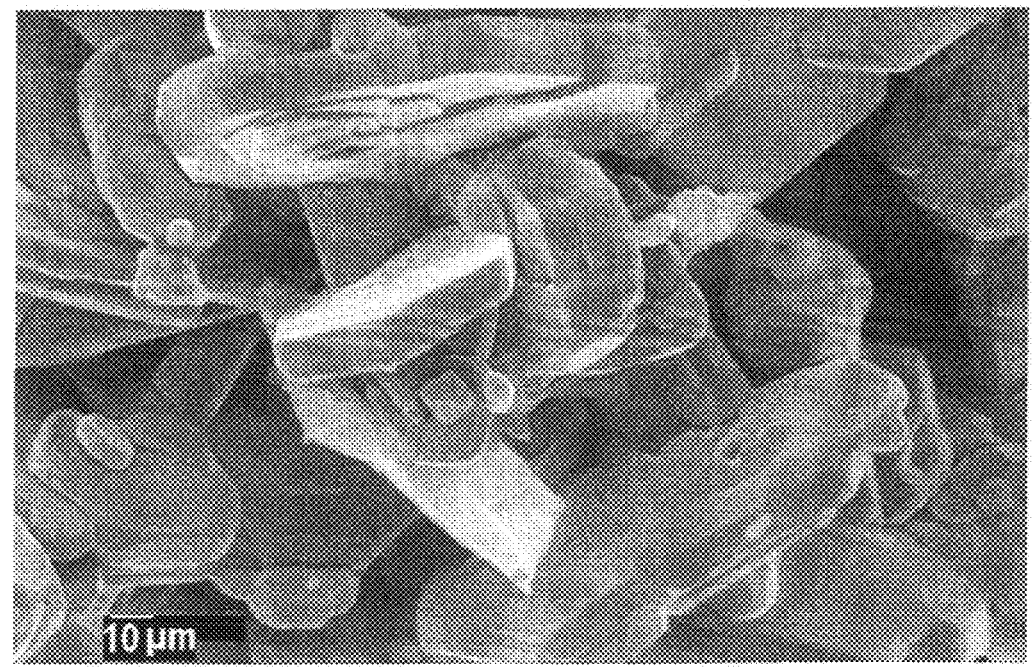
Figure 2A:
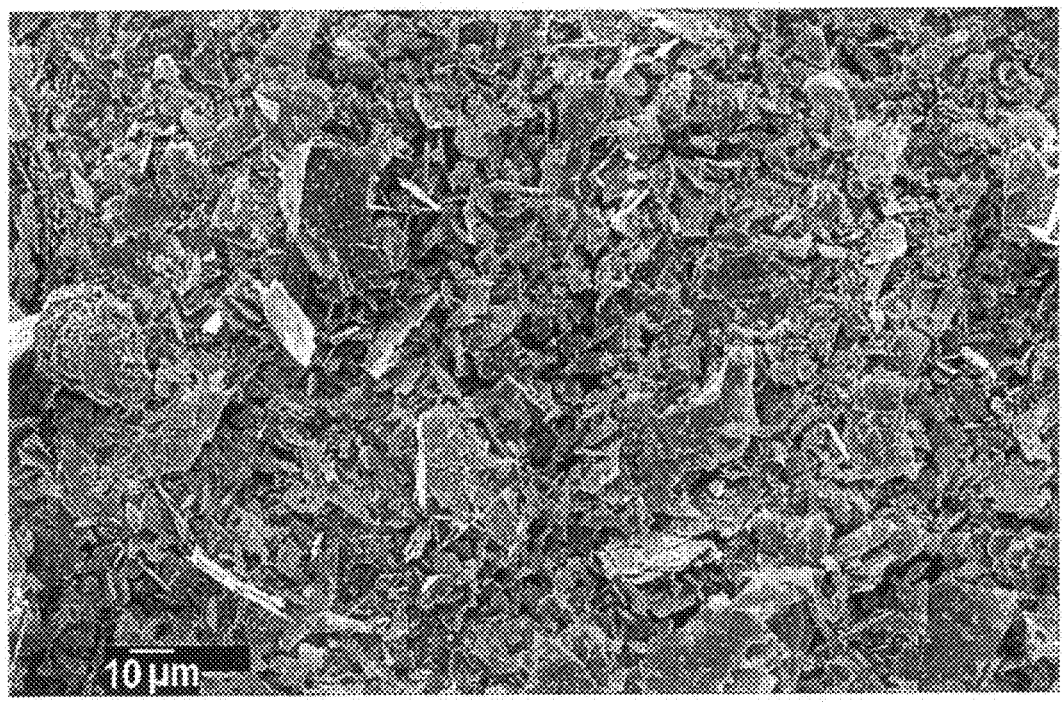
FIGS. 2A through 2D are scanning electron micrographs of another special effect pigment in accordance with the invention at 1,400×, 2,800×, 5,600× and 14,000× magnification, respectively.
Figure 2B:
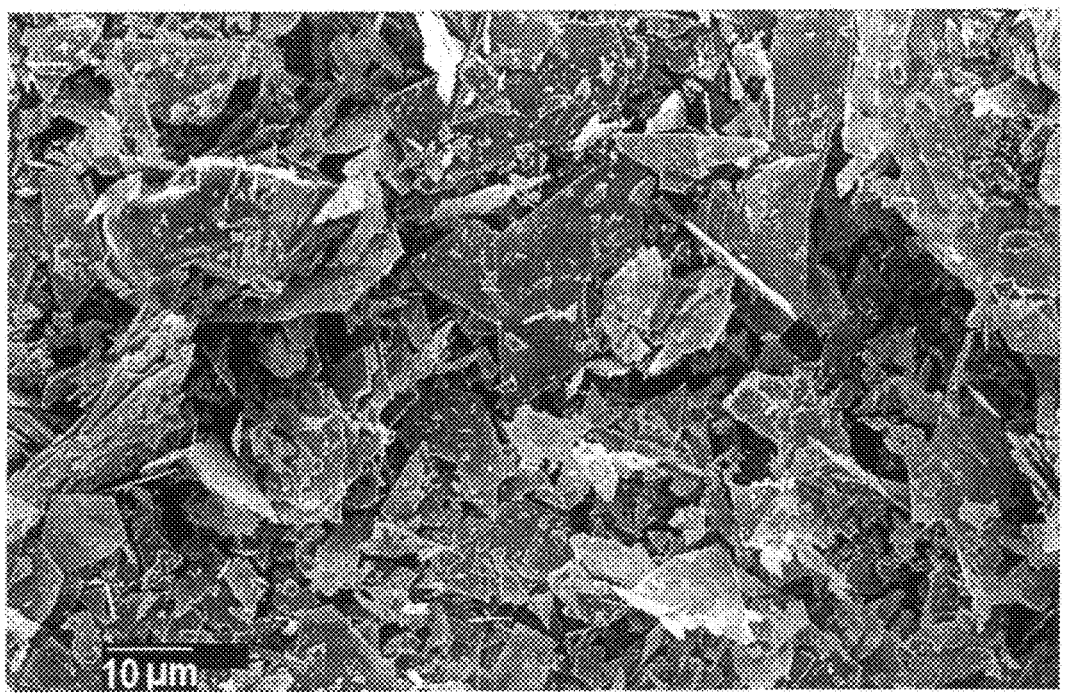
Figure 2C:
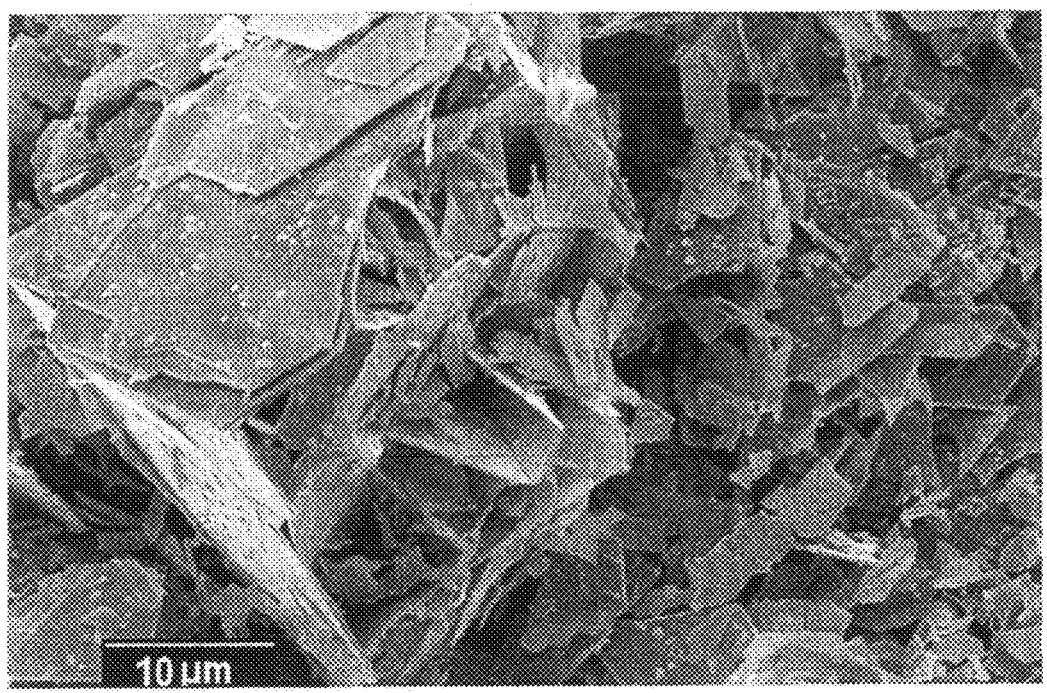
Figure 2D:
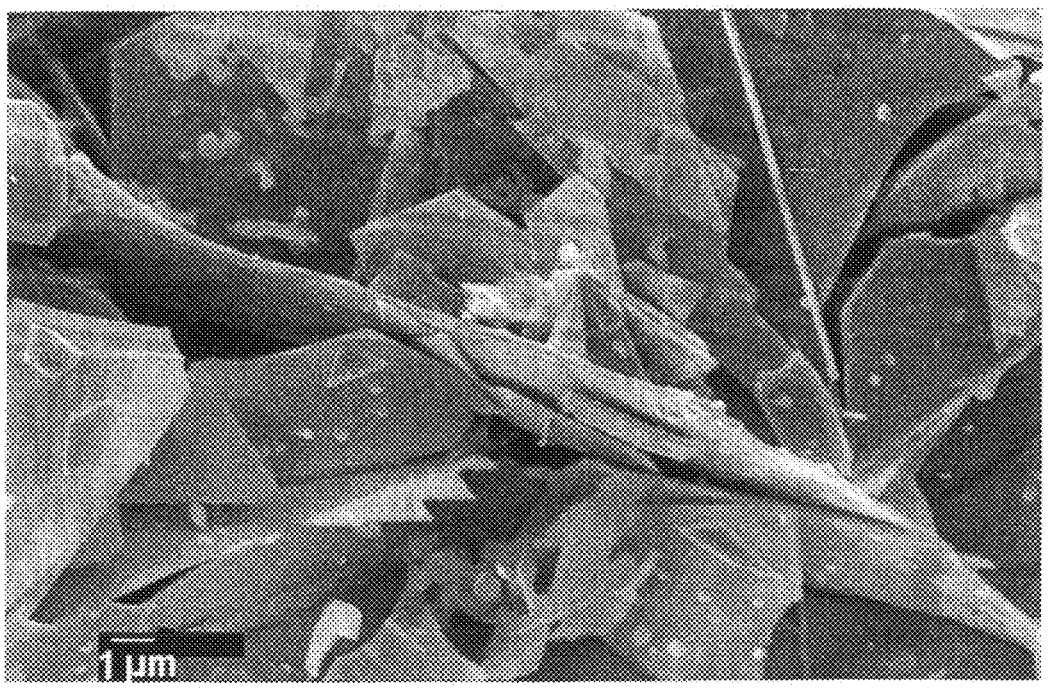
Figure 3A:
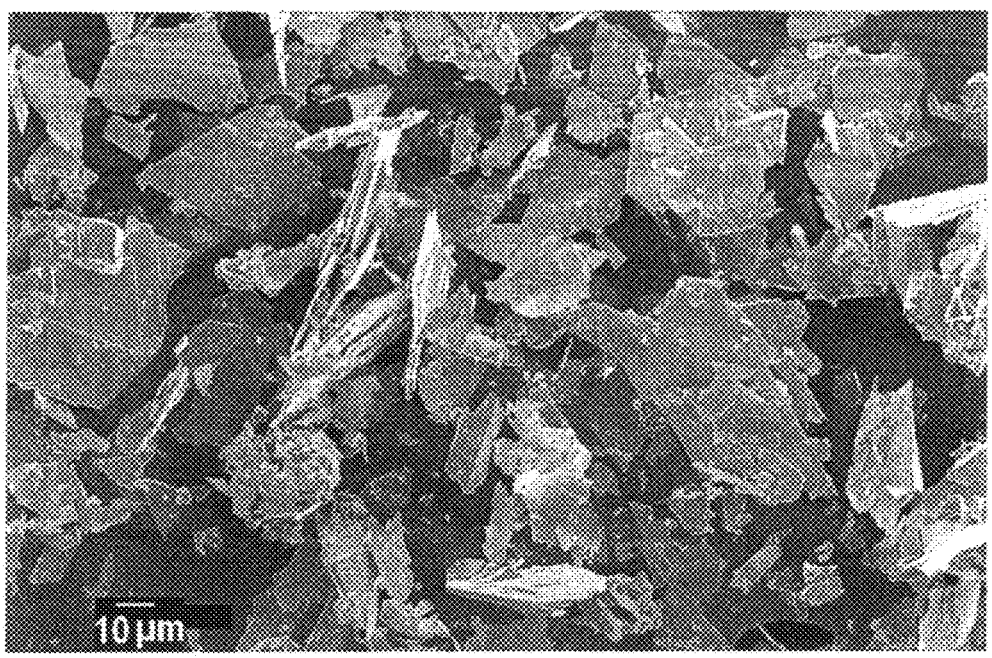
FIGS. 3A through 3D are scanning electron micrographs of yet another special effect pigment in accordance with the invention at 1,400×, 2,800×, 5,600× and 14,000× magnification, respectively.
Figure 3B:
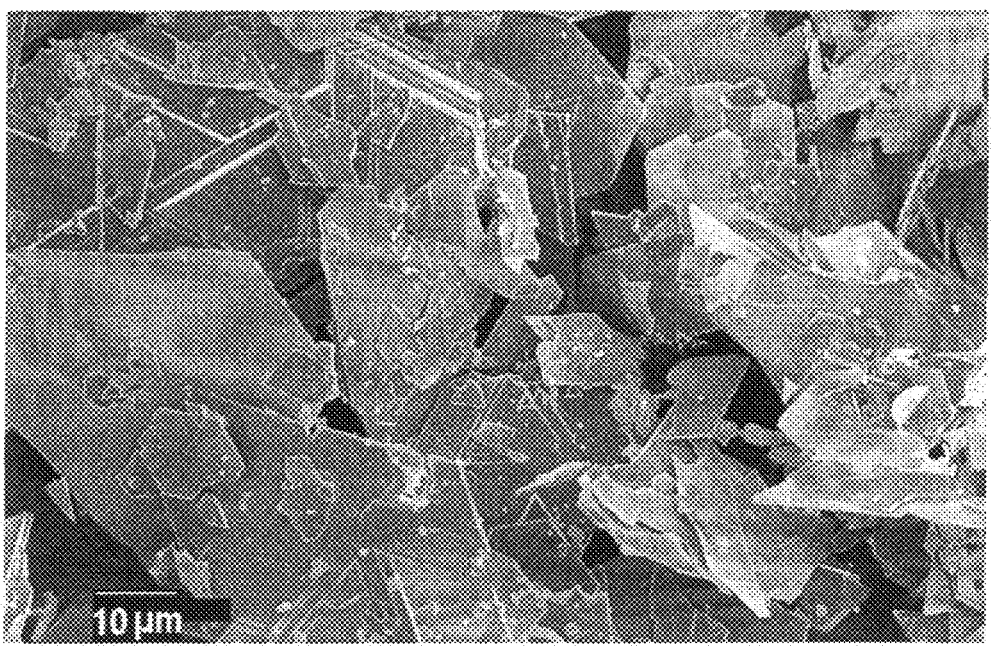
Figure 3C:
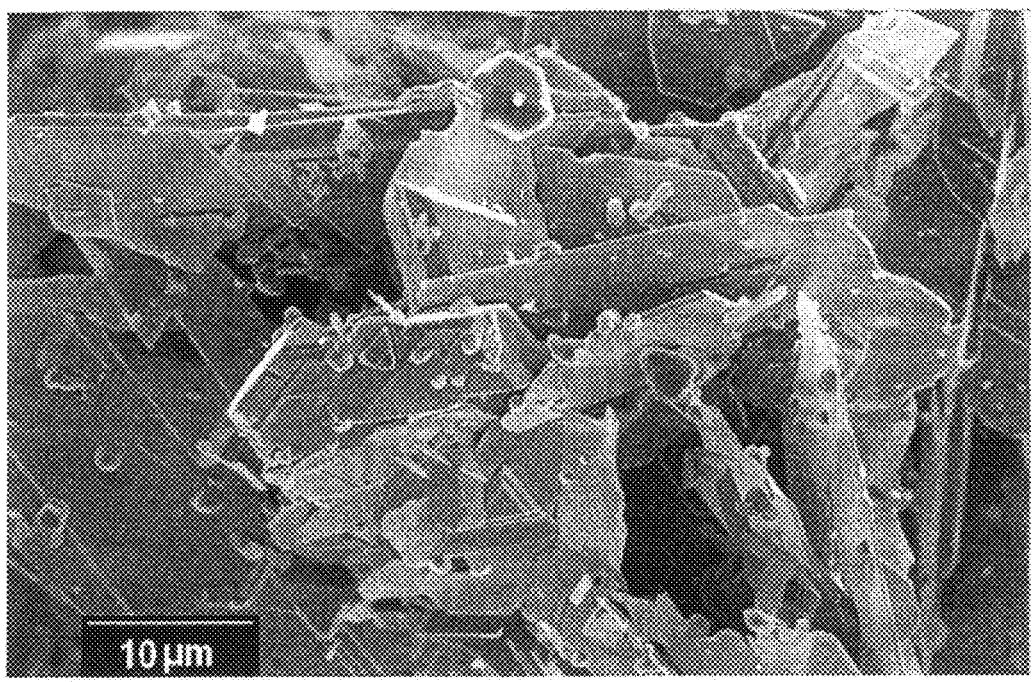
Figure 3D:
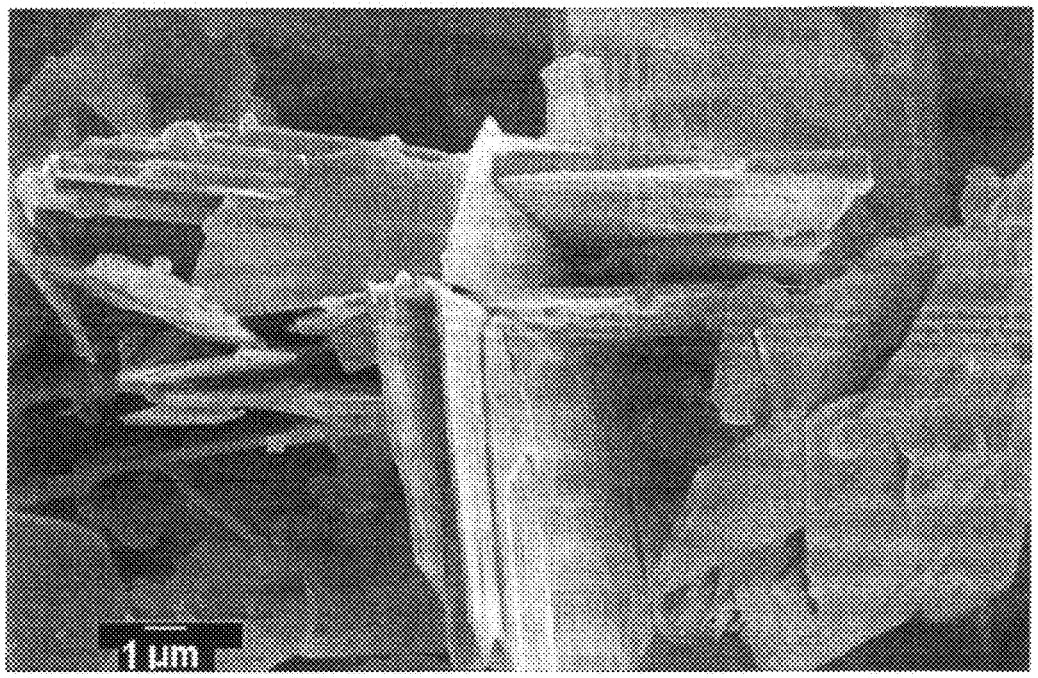
Figure 4A:
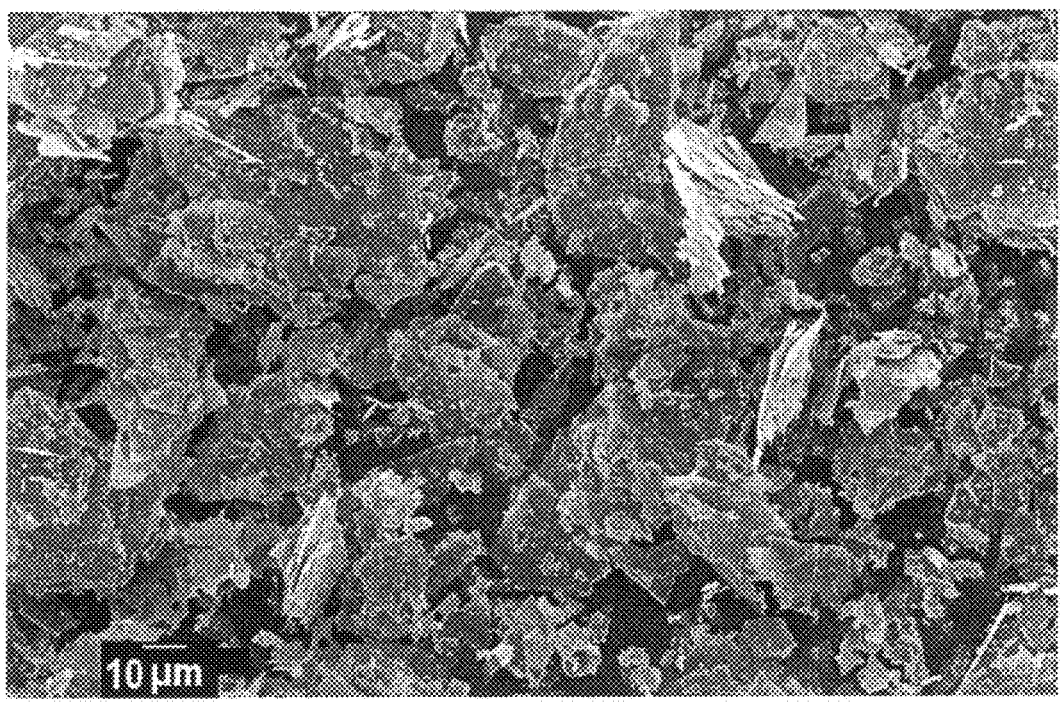
FIGS. 4A through 4D are scanning electron micrographs of yet another special effect pigment in accordance with the invention at 1,400×, 2,800×, 5,600× and 14,000× magnification, respectively.
Figure 4B:
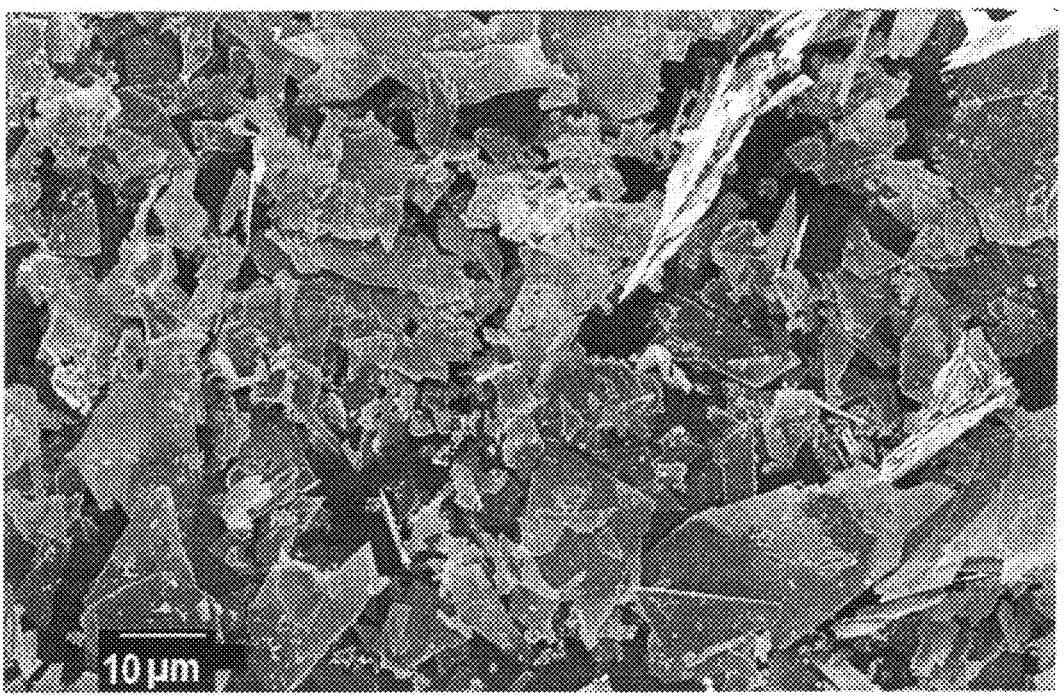
Figure 4C:
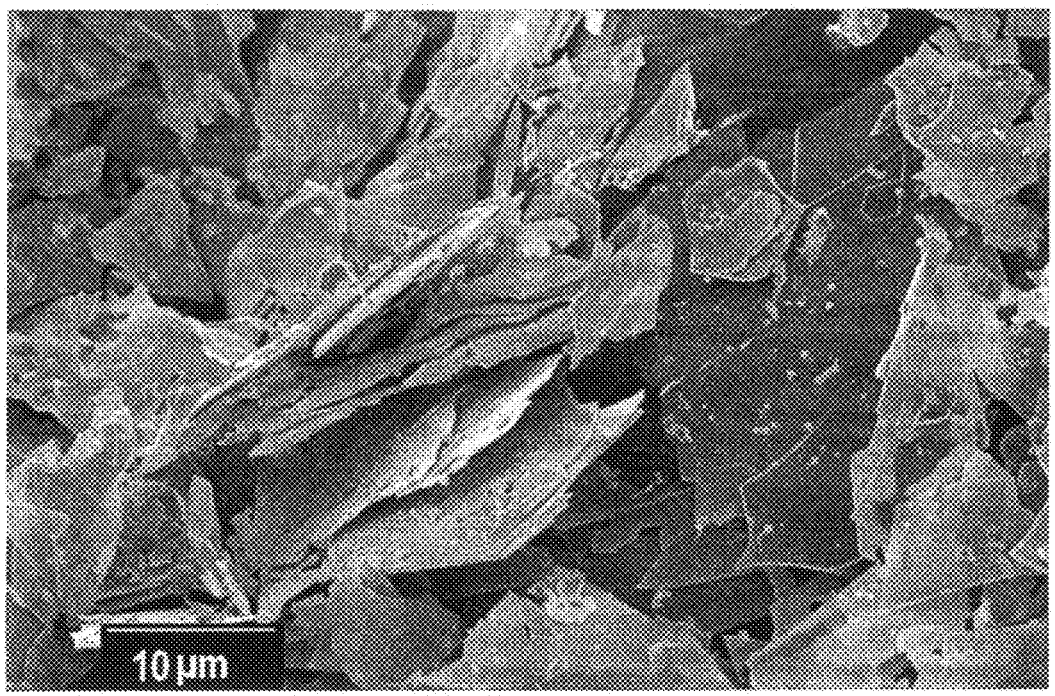
Figure 4D:
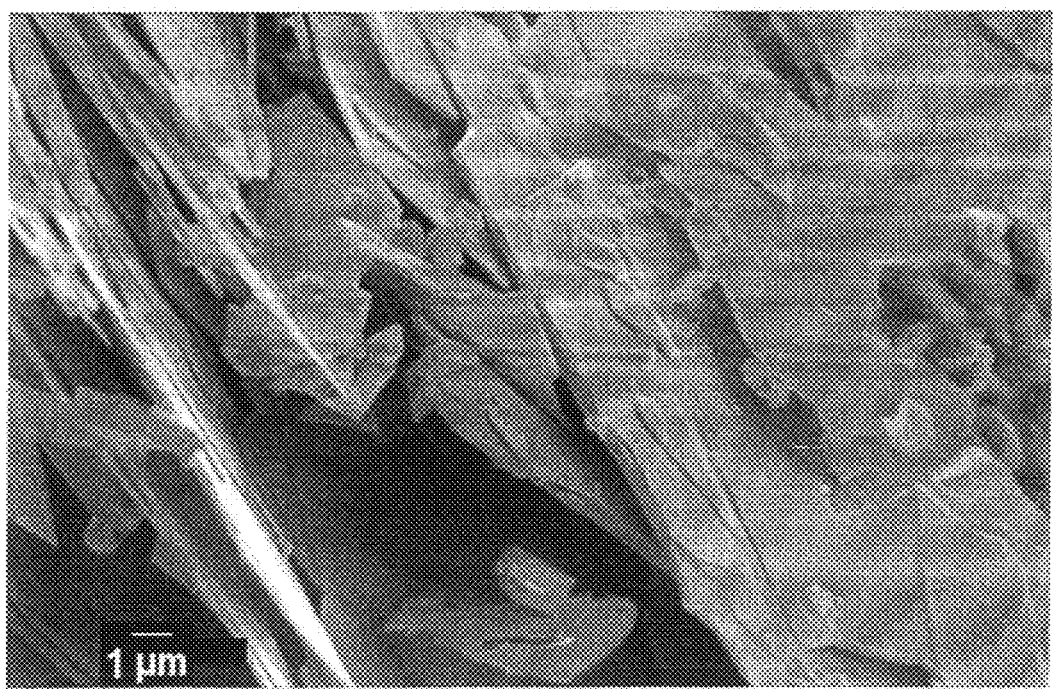
Figure 5A:
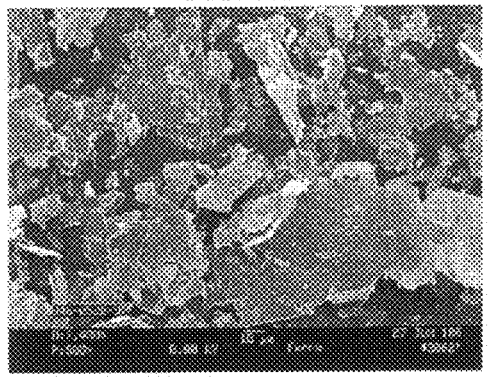
FIGS. 5A through 5D are scanning electron micrographs of yet another special effect pigment in accordance with the invention at 1,400×, 2,800×, 5,600× and 14,000× magnification, respectively.
Figure 5B:
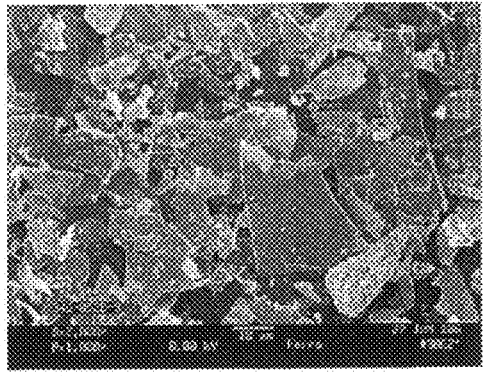
Figure 5C:
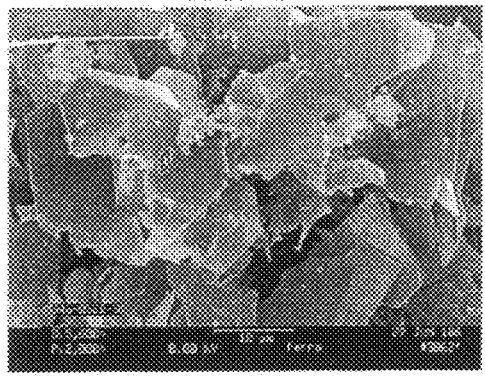
Figure 5D:
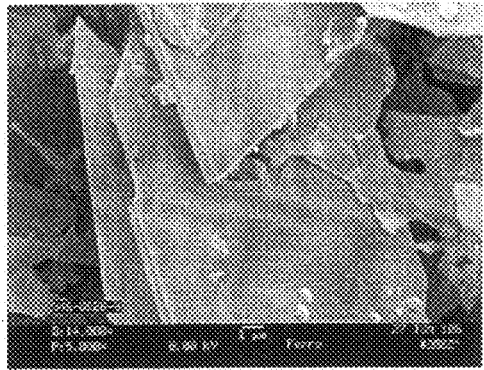
Figure 6A:
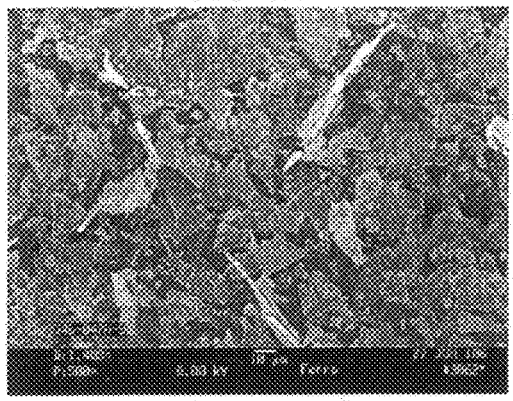
FIGS. 6A through 6D are scanning electron micrographs of yet another special effect pigment in accordance with the invention at 1,400×, 2,800×, 5,600× and 14,000× magnification, respectively.
Figure 6B:
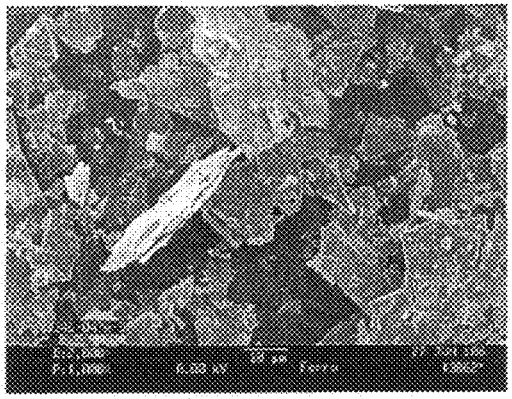
Figure 6C:
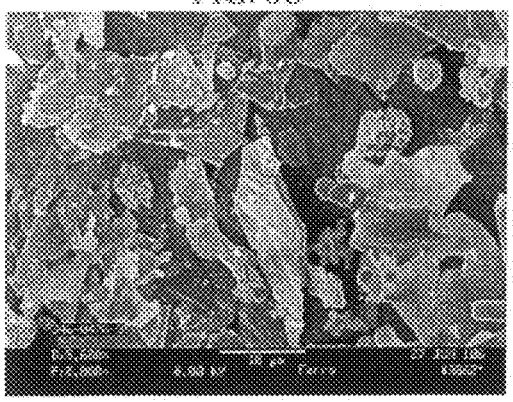
Figure 6D:

Special effect pigments according to the present invention can be formed by thoroughly dry or wet mixing precursor compounds containing the elements necessary to form a pigment batch comprising crystals exhibiting a McConnellite crystal structure, and calcining the precursor compounds to form the pigment batch. Throughout the instant specification and in the appended claims, the term "McConnellite crystal structure" is intended to refer to a crystal that is similar to that exhibited by the mineral known as McConnellite. The McConnellite mineral is generally described as having the formula $Cu^{1+}Cr^{3+}O_2$. In the present invention, other elements in addition to copper, chromium and oxygen may be present in the crystal provided that the diffraction pattern of the pigment is substantially similar to the JPDS x-ray diffraction pattern attributed to the mineral known as McConnellite (e.g., JPDS 39-0247). Generally speaking, the precursor compounds used to form the pigment batch will comprise metal oxides such as copper (II) oxide and chromium (III) oxide. However, other precursor compounds may be used if they can either be decomposed and/or converted to an oxide species under the calcining conditions necessary for formation. It will be appreciated that a wide variety of precursors can be used to practice the invention, and that the selection of precursors is not per se critical.

The precursor compounds are preferably fine powders, which are thoroughly mixed in appropriate proportions prior to calcination. Fineness is not critical, but average particle size diameters from approximately 0.2 microns to about 5 microns are preferred. Standard pigment grade metal oxide powders and precursors currently available on the market can generally be used without additional milling prior to mixing. Mixing can occur in a dry state, or the powders can be mixed in solution, dried, and then milled again if necessary to break up any particle agglomerations. The mixture of precursor compounds can then be calcined to form the pigment batch.

Calcination can be carried out in a standard refractory crucible, kiln, or other suitable device. It will be appreciated that calcination can be achieved by statically heating the batch, or by a dynamic calcination method such as through the use of a rotary calciner. Calcination sufficient to form a pigment batch according to the invention can be accomplished by heating the mixture of precursor compounds at a temperature of from about 600° C. to about 1300° C. In the presently most preferred method of the invention, calcination is accomplished by quickly heating the pigment from ambient temperature to 500° C. in about 10 minutes, followed by gradually heating the mixture of precursor compounds to about 900° C. over a period of 4 hours, and then holding the temperature at about 900° C. for about 8 hours. It will be understood to those practicing the invention that a wide range of calcination temperatures, times and conditions can be used, and that so long as the temperature and length of time used is sufficient to form the McConnellite phase according to the present invention, the temperature and length of time of calcination is not per se critical.

An embodiment of the invention is a composition comprising intentionally added mixed-metal oxide pigment particles having a McConnellite crystal structure.

A further embodiment of the invention is a method of making a pigment comprising: providing a mixture of precursor compounds comprising copper atoms, chromium atoms, and oxygen atoms; and calcining the mixture to produce the pigment, wherein the pigment comprises at least 10 wt % of particles having a McConnellite crystal structure. Other embodiments of the invention include a glass enamel composition comprising an intentionally added mixed-metal oxide pigment including particles having a McConnellite crystal structure. A further embodiment is a substrate coated with a coating, wherein the substrate is selected from the group consisting of metal, glass, enamel, or ceramic, and wherein the coating comprises, prior to firing or curing, an intentionally added mixed-metal oxide pigment including particles having a McConnellite crystal structure.

The phrase "firing or curing" is used to help distinguish the ways the mixed-metal oxide pigments having a McConnellite crystal structure can be incorporated into a composition, either as a coating on a substrate or as a pigment dispersed in a matrix. It will be apparent to those skilled in the art when firing is appropriate and when curing is appropriate.

In some instances, it is unnecessary to employ high-intensity milling of the pigments herein after calcination. Particle deagglomeration can typically be accomplished on a laboratory scale by pressing the pigment batch through a sieve, which is sometimes referred to as "lawning" the pigment. While milling in a liquid with or without milling media may yield a suitable pigment, in order to maintain the plate-like structure of the pigment particles, dry processing methods such as pulverization, air milling (with or without classification) and lawning are preferred.

The resulting pigment is believed to comprise at least 10 wt % of crystals having the McConnellite crystal structure. The precursor compounds used to form the pigment and the crystal diffraction pattern of the pigment are similar to crystal structures reported for naturally occurring McConnellite, which suggests that the crystals have the McConnellite crystal structure. It is possible, however, that the crystals have a different structure than McConnellite.

The special effect pigment according to the invention comprises at least 10 wt %, more preferably at least about 50 wt % of particles having a McConnellite crystal structure. Preferably, a portion of the pigment particles have a plate-like shape. More preferably, nearly all of the particles, preferably at least about 70 wt %, more preferably at least about 80 wt %, and most preferably at least about 90 wt % of the pigment in the pigment batch will exhibit the plate-like shape. The aspect ratio of the plate-like particles will preferably be at least 2 to 1, more preferably at least 4 to 1, and most preferably at least 10 to 1.

Without being bound by theory, it is believed that the presence of other elements in the precursor compounds affects the resulting pigment particles. For example, silicon, which can be provided as silicon dioxide, appears to help facilitate the growth rate of the flat, plate-like crystals. The presence of alkali halides such as sodium chloride in the mixture of precursor compounds appears to facilitate the growth of plate-like crystals, presumably either by vapor or liquid phase mechanisms. Alkali materials such as sodium antimonate are also believed to assist in the formation of plate-like crystals.

The McConnellite crystal structure is typically expressed as having the formula $Cu^{1+}Cr^{3+}O_2$. The presence of atoms of elements other than copper or chromium in the mixture of precursor compounds tends to produce crystals having altered color and/or appearance attributes, without adversely affecting the desired flat plate-like structure of the crystals in the pigment batch. It is believed that inclusion of other atoms in the crystals will result in pigment particles that are lighter or darker than crystals containing only copper, chromium and oxygen. Suitable additional elements include, for example, iron, aluminum, manganese, antimony, tin, titanium, cobalt, nickel, zinc and silver. Other modifiers include alkali and alkaline earth metals, semi metals, rare earths, transition metals, and non-metal elements. It is believed that the inclusion of elements such as iron and manganese may contribute to the development of other crystal structures, such as Delafossite ($Cu^{+1}Fe^{+3}O_2$) and/or Crednerite ($Cu^{+1}Mn^{+3}O_2$). Inclusion of small amounts (e.g., 1-5 wt %) of silica appears to have a significant effect on the development of plate-like particles. Particles in pigment batches formed with small amounts of silica tend to have a much higher aspect ratio than particles in pigment batches that are formed without small amounts of silica.

A special effect pigment according to the invention comprises a mixed-metal oxide pigment comprising plate-like particles having the formula $ABO_2$, wherein A is a monovalent metal atom and B is a trivalent metal atom. Preferably, the pigment particles exhibit a plate-like morphology and a chemical structure conforming to the formula $ABO_2$, where A is copper or an element capable of being in a monovalent state and B is chromium or an element capable of being in a trivalent state. Preferably, the monovalent atom is copper and the trivalent atom is chromium. More preferably, the particles having the McConnellite crystal structure include at least about 10 wt %, and more preferably at least about 75 wt %, of such pigment particles.

Suitable atoms that can be substituted for copper include, for example, silver and platinum. Suitable atoms that can be substituted for chromium include iron, aluminum and manganese. Preferably, the mole ratio of monovalent capable atoms to trivalent capable atoms is from about 1:4 to about 4:1, more preferably from about 1:2 to about 2:1, and most preferably from about 1:1.5 to about 1.5:1. It will be appreciated that in order to achieve a crystal structure that is similar to or the same as the McConnellite crystal structure, the mole ratio of "A" elements to "B" elements in the $ABO_2$ formula must be essentially equal, and there must be sufficient oxygen atoms present to maintain overall charge neutrality. In addition to metals capable of being in a monovalent and trivalent state, a pigment according to the invention can further comprise metal atoms capable of being in a divalent or tetravalent state. It is believed that small amounts of divalent or tetravalent metals or semimetals may be doped into the structure and accounted for by other alternate valence substitutions in the structure, oxygen vacancies, metal atom vacancies or interstitial sites. Elements that may be added by these methods may contain the list mentioned above, namely iron, aluminum, manganese, antimony, tin, titanium, cobalt, nickel, zinc and silver. Other modifiers may include alkali and alkaline earth metals, semimetals, transition metals, and other non-gaseous non-metal elements.

The special effect pigments according to the invention are particularly suitable for use in formulating paints and other coatings that exhibit a metal flake effect when applied to substrates. It is believed that when the generally, flat plate-like surface of the particles in the pigment batch become somewhat randomly dispersed in a binder system, light is reflected off the particles in random directions providing a glittery metallic effect, otherwise known as a "metal flake" or a "sparkle" effect. In addition, when added to an optically thin coating over a colored substrate, the degree of hiding of the substrate may be changed as the angle of viewing changes. This phenomenon is known as "flop". Generally, "optical density" is a measure of transparency, and is defined as the fraction of radiation that is scattered between a point and the observer.

For a given wavelength, optical density is an expression of the transmittance of an optical element. Optical density is expressed by $\log_{10}(1/T)$ where T is transmittance. Hence, "optically thin," means that the attenuation of the radiation beam is low, or that the percentage of the incident radiation beam transmitted through such space is high, perhaps 60% or more, 70% or more, 80% or more, or even 90% or more, and hence the optical density is low, for example, 40%, 30%, 20% or 10%.

To provide more flop and color difference with the change in angle, the pigment should be added to a relatively clear layer on the surface of a substrate. As the angle of view changes large differences can occur, the reflection from the microscopic mirrored surface of the effect pigment is minimized, and the color of the substrate is more apparent. Such coatings, because they are not completely hiding are sometimes referred to as "optically thin."

Unlike conventional metal flake effect pigments, special effect pigments according to the invention tend to be darker in color and thus do not lighten or wash out the colors of the optically thin binders in which they are dispersed, or the substrate which they cover. This allows for the preparation of darker colored metal flake coatings than previously obtainable using conventional metal flake effect pigments.

It will be appreciated that inasmuch as the special effect pigments according to the invention are mixed metal oxide pigments, such special effect pigments can be used in applications where traditional mixed metal oxide pigments are used. For example, special effect pigments according to the invention could be used to provide color or a special effect in glass materials including generally, vitreous inorganic materials, such as bulk glasses, glazes and/or glass enamels. The special effect pigments according to the invention could be used to color a bulk object composed of an organic resin.

The special effect pigments according to the invention would likely be suitable for use in the preparation of protective layers for preventing corrosion of metallic substrates. The special effect pigments could be added to cements, plasters, or stuccos, either in bulk or in surface treatments, to provide special effects. The special effect pigments according to the invention could be used to produce and inks, particularly inks that give a metallic appearance. Because of the flat plate-like morphology of the special effect pigments according to the invention, the pigments would likely be useful for providing mechanical protection to the surface of objects, or as lubricants.

Other potential uses of the special effect pigments could be as data storage substrates, as couplers for microwave radiation, and as absorbers for electromagnetic radiation. Accordingly, an embodiment of the invention is a method of absorbing electromagnetic radiation comprising: applying to a substrate a formulation comprising, prior to firing or curing, a mixture comprising particles of a calcined mixed metal oxide comprising copper and chromium, firing or curing the mixture to produce a pigment coating on the substrate, and exposing the pigment coating to electromagnetic radiation. In a preferred embodiment, the method involves the pigment coating absorbing radiation having a wavelength shorter than 400 nm, and in a more preferred embodiment, the method involves the pigment coating absorbing ultraviolet radiation.

The pigments have been tested for utility in laser marking applications, and appear to be suitable for such use. By varying the intensity and time of irradiation with laser energy, it is possible to produce different colored markings that range in color from silver to bronze to black.

The special effect pigment according to the invention could be further treated (e.g., coated with a metal such as silver or aluminum) to produce a full or partial mirror-like finish on the individual pigment particles, if desired. In addition, the pigment could be coated with one or more transparent or semi-transparent layers of different refractive index to produce an interference layer on the individual pigment particles.

Applications for the pigments and coatings herein include electronic components comprising a fired or cured coating, where the coating comprises, prior to firing or curing, any pigment composition disclosed herein. A semiconductor comprising any mixed-metal oxide pigment herein may be used in a solar cell. The semiconducting mixed-metal oxide will include at least one dopant atom, preferably no greater than about 1 mol % of a dopant, and will have a McConnellite crystal structure. Other applications include coated metal substrates, where, prior to firing or curing, the coating comprises binder system and a pigment dispersed in the binder system, wherein the pigment comprises particles having a McConnellite crystal structure. Metal substrates including automotive body panels may be coated with compositions, such as paints, including pigments comprising particles having a McConnellite crystal structure. The mixed-metal oxide pigments having a McConnellite crystal structure can also be used to fashion coatings useful in radio frequency shielding.

EXAMPLES

The following examples are intended to illustrate the invention without limiting it in any way. All raw materials referenced in the examples are standard pigment grade powders unless otherwise indicated.

Example 1

Special Effect Pigments (SEP) 1 through 6 were each separately prepared by mixing the amounts of the ingredients shown in Table 1 below together in a high intensity mixer and then heating the resulting mixture in a kiln from 500° C. to 900° C. in 4 hours, and then holding the temperature at 900° C. for 8 hours.

TABLE 1

| Ingredient | SEP 1 | SEP 2 | SEP 3 | SEP 4 | SEP 5 | SEP 6 |
|---|---|---|---|---|---|---|
| Copper (II) Oxide | 51.1 g | 51.1 g | 51.1 g | 51.1 g | 51.1 g | 51.1 g |
| Chromium (III) Oxide | 48.9 g | 48.9 g | 48.9 g | 48.9 g | 48.9 g | 48.9 g |
| AEROSIL[1] | — | 3.0 g | 3.0 g | 3.0 g | 3.0 g | 3.0 g |
| Sodium Chloride | — | — | 2.0 g | — | 2.0 g | 2.0 g |
| Sodium Antimonate | — | — | — | 2.0 g | 2.0 g | 2.0 g |
| Cu—Mn—Fe Pigment[2] | — | — | — | — | — | 3.0 g |

[1]AEROSIL is a fumed silica available from Degussa AG of Dusseldorf, Germany;
[2]Cu—Mn—Fe Pigment is a copper-manganese-iron based mixed metal pigment available from Ferro Corporation of Cleveland, Ohio under the trade designation F-6331-2.

After heating, the pigments were removed from the kiln and allowed to cool. All of the pigments exhibited a metallic sparkle that was silvery in color. Particle agglomerations were broken down by pressing the pigments through a 28 mesh screen.

Example 2

Three paint formulations were prepared to compare the differences in appearance obtained between a special effect pigment according to the invention and a conventional metal flake pigment. The composition of the paint formulations is not known by applicants, and is believed to be proprietary to the prospective customer that prepared the formulations in accordance with the terms of a confidentiality agreement. Applicants believe that three identical violet paint bases were used to prepare the paint formulations. In the first paint formulation, 3 wt % of a conventional mica-based "metal flake" pigment was mixed into the violet paint base. In the second paint formulation, 1.5 wt % of the same conventional mica-based "metal flake" pigment used in the first paint formulation and 1.5 wt % of SEP 6 from Example 1 were mixed into the violet paint base. In the third paint formulation, 3.0 wt % of SEP 6 from Example 1 was mixed into the violet paint base.

Figure 7:
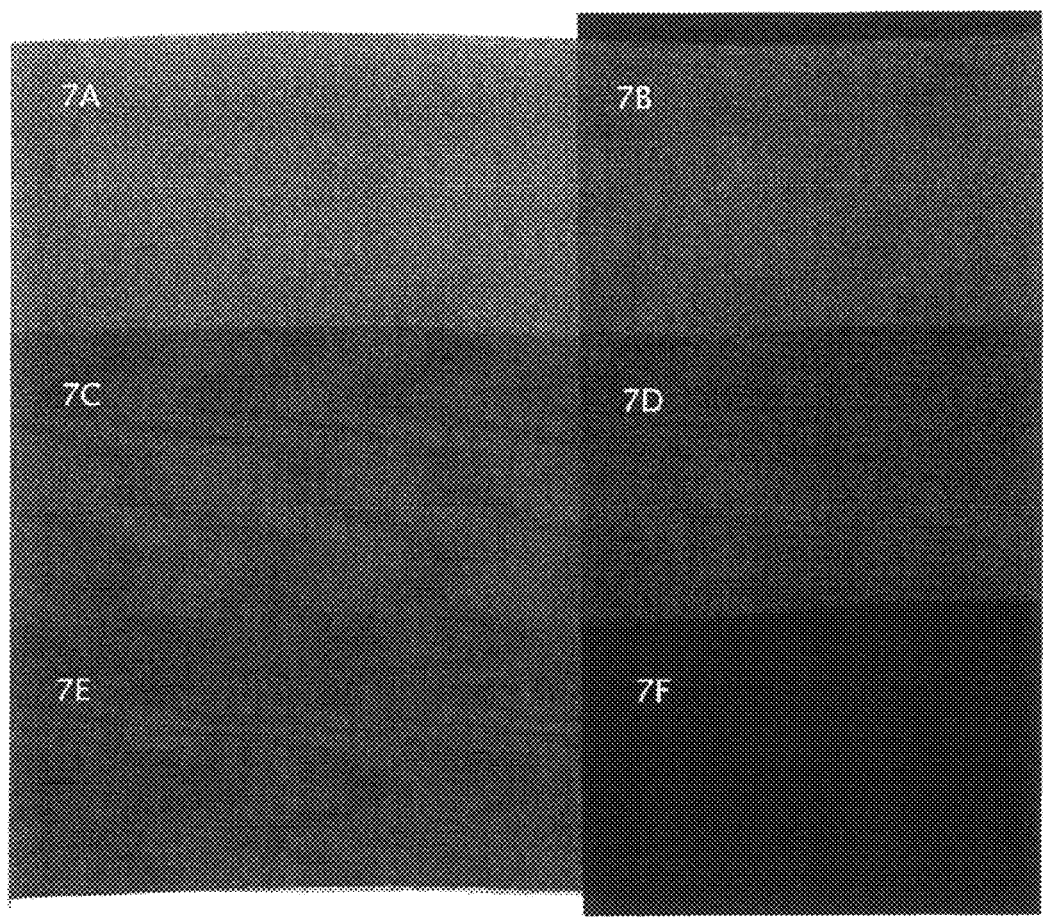
FIG. 7 is a photograph of a paint test card painted with a paint formulation containing only a conventional metal flake effect pigment, a paint formulation containing a mixture of a conventional metal flake effect pigment and a special effect pigment according to the invention, and a paint formulation containing only a special effect pigment according to the invention.

All three paint formulations were applied by spraying to separate portions of a paper test card that included a white area and a black area. FIG. 7 is a color photograph of a portion of the painted test card. The blocks marked 7A and 7B show the first paint formulation containing the conventional mica-based pigment on the white and black areas of the test card, respectively. The blocks marked 7C and 7D show the second paint formulation containing the 1:1 mixture of the conventional mica-based pigment and SEP 6 on the white and black areas of the test card, respectively. And, the blocks marked 7E and 7F show the third paint formulation containing SEP 6 on the white and black areas of the test card, respectively.

FIG. 7 shows that SEP 6 does not cause the violet paint base to become lighter in color. In other words, the color does not become washed out. Examination of the test card in various lighting conditions revealed that the third paint formulation containing SEP 6 exhibited a consistent, more aesthetically pleasing "metal flake" appearance over a wider range of viewing angles and lighting conditions than the first paint formulation containing the mica-based special effect pigment.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A composition comprising intentionally added synthetic mixed-metal oxide pigment particles, wherein at least 10 wt% of the synthetic mixed-metal oxide pigment particles have a $Cu^{1+}Cr^{3+}O_2$ crystal structure, and wherein at least about 70 wt% of the synthetic mixed-metal oxide pigment particles having the $Cu^{1+}Cr^{3+}O_2$ crystal structure have a plate-like morphology.

2. The composition of claim 1, wherein the synthetic mixed-metal oxide pigment particles are obtained by calcining a mixture of precursor compounds comprising copper atoms, chromium atoms, and oxygen atoms at a temperature of from about 600° C. to about 1300° C.

3. The composition of claim 1, wherein the synthetic mixed-metal oxide pigment particles having the $Cu^{1+}Cr^{3+}O_2$ crystal structure comprise at least 50 wt% of the pigment.

4. The composition of claim 1, wherein at least about 90 wt% of the synthetic mixed-metal oxide pigment particles having the $Cu^{1+}Cr^{3+}O_2$ crystal structure have a plate-like morphology.

5. The composition of claim 1, wherein the synthetic mixed-metal oxide pigment particles having the $Cu^{1+}Cr^{3+}O_2$ crystal structure have an aspect ratio of greater than 2:1.

6. The composition of claim 1, wherein the synthetic mixed-metal oxide pigment particles having the $Cu^{1+}Cr^{3+}O_2$ crystal structure are doped with atoms of one or more monovalent elements and/or atoms of one or more trivalent elements.

7. The composition of claim 6, wherein the one or more monovalent elements is selected from the group consisting of copper, silver and platinum and the one or more trivalent elements is selected from the group consisting of chromium, aluminum, iron and manganese.

8. The composition of claim 7, wherein the synthetic mixed-metal oxide pigment particles further comprise atoms of divalent elements, tetravalent elements, or combinations thereof.

9. An electronic component comprising a fired or cured coating, comprising, prior to firing or curing, the composition of claim 1.

10. The composition of claim 1, wherein the synthetic mixed-metal oxide pigment particles are coated with a material selected from the group consisting of silver metal, aluminum metal, a transparent coating having a different refractive index from the synthetic mixed-metal oxide particles, a translucent coating having a different refractive index from the synthetic mixed-metal oxide particles, and combinations thereof.

11. A solar cell comprising a semiconductor including the composition of claim 1, wherein the synthetic mixed-metal oxide pigment particles further comprise a dopant in an amount not exceeding about 1 mol%.

12. A formulation comprising the composition of claim 1 dispersed in a binder system.

13. A coated metal substrate comprising a coating, wherein the coating comprises, prior to curing or firing, the formulation of claim 12.

14. An automotive body panel comprising, prior to curing, the formulation of claim 12.

15. A vitreous inorganic composition comprising an intentionally added synthetic mixed-metal oxide pigment particles, wherein at least 10 wt% of the synthetic mixed-metal oxide pigment particles have a $Cu^{1+}Cr^{3+}O_2$ crystal structure, and wherein at least about 70 wt% of the synthetic mixed-metal oxide pigment particles having the $Cu^{1+}Cr^{3+}O_2$ crystal structure have a plate-like morphology.

16. The composition of claim 15, wherein the synthetic mixed-metal oxide pigment particles are dispersed throughout the composition.

17. A substrate coated with a coating, wherein the substrate is selected from the group consisting of metal, glass, enamel, or ceramic, wherein the coating comprises, prior to firing, intentionally added synthetic mixed-metal oxide pigment particles, wherein at least 10 wt% of the synthetic mixed-metal oxide pigment particles have a $Cu^{1+}Cr^{3+}O_2$ crystal structure, and wherein at least about 70 wt% of the synthetic mixed-metal oxide pigment particles having the $Cu^{1+}Cr^{3+}O_2$ crystal structure have a plate-like morphology.

* * * * *